United States Patent [19]

Kanemoto et al.

[11] Patent Number: 4,583,159
[45] Date of Patent: Apr. 15, 1986

[54] NUMERICAL CONTROLLED MACHINE TOOL MAKING INTERMEDIATE MEASUREMENTS

[75] Inventors: Masakazu Kanemoto, Gotenba; Tetsu Yoshida, Numazu; Fumio Kamahora, Susono, all of Japan

[73] Assignee: Toshiba Kikai Kabushiki Kaisha, Tokyo, Japan

[21] Appl. No.: 494,558

[22] Filed: May 13, 1983

[30] Foreign Application Priority Data

May 24, 1982 [JP] Japan .................. 57-87658

[51] Int. Cl.⁴ .................. G06F 15/00; G05B 19/00
[52] U.S. Cl. .................. 364/170; 364/474; 364/571; 318/572; 318/632
[58] Field of Search .............. 364/167, 170, 571, 513, 364/474; 318/572, 632; 901/44, 45, 46, 50; 33/169 C, 172 C

[56] References Cited

U.S. PATENT DOCUMENTS

| | | | |
|---|---|---|---|
| 4,118,871 | 10/1978 | Kirkham | 364/474 X |
| 4,190,889 | 2/1980 | Etoh et al. | 364/474 |
| 4,281,385 | 7/1981 | Nakaso et al. | 364/474 |
| 4,296,364 | 10/1981 | Fukuyama et al. | 364/474 X |
| 4,362,977 | 12/1982 | Evans et al. | 318/632 X |
| 4,370,721 | 1/1983 | Berenberg et al. | 364/170 X |
| 4,382,215 | 5/1983 | Barlow et al. | 364/474 X |
| 4,428,055 | 1/1984 | Kelley et al. | 364/474 |
| 4,481,592 | 11/1984 | Jacobs et al. | 364/169 X |
| 4,484,293 | 11/1984 | Minucciani et al. | 364/474 X |

Primary Examiner—Jerry Smith
Assistant Examiner—Allen MacDonald
Attorney, Agent, or Firm—Cushman, Darby and Cushman

[57] ABSTRACT

A numerical controlled machine tool apparatus capable of providing intermediate measurement (in process measurement) during the carrying out of a machining process on a workpiece. A spindle of the apparatus, usually used for mounting a machining tool, is also capable of mounting a measuring tool which generates a contact signal when the measuring tool on the spindle is brought into contact with the workpiece. A measuring control unit including a memory is capable of compensating for any deviation that may exist between a center axis line of the measuring tool and the center axis line of the spindle, thereby making the apparatus capable of carrying out accurate measurements and adjusting a machining process based on the result of such an accurate measurement.

11 Claims, 8 Drawing Figures

NUMERICAL CONTROLLED MACHINE TOOL MAKING INTERMEDIATE MEASUREMENTS

BACKGROUND OF THE INVENTION

This invention relates in general to numerical controlled machine tools. More specifically, the present invention provides a numerical controlled machine tool apparatus that is capable of both machining and making measurements of a workpiece during the machining process.

In machining a workpiece by using a machine tool, it is sometimes necessary to measure various dimensions of the workpiece at a time it is partially machined during a machining process in order to get information for modifying the machining process. For example, it may be advantageous to take an intermediate measurement of dimensions such as diameters of a machined bore or coordinate values corresponding to the center of the machined bore to determine how to proceed with further precise or finish machining.

Conventionally, an operator stops the machining process, manually measures the workpiece, and then resumes the remaining machining process making whatever changes in the process are appropriate in view of the measurement information obtained. Heretofore, the sequence of tools used in a machining process has been designated by what is referred to as a "part program" stored in a memory of the numerical control machining apparatus. However that "part program" has not included measuring steps. It has only included machining steps.

With the advent of numerical controlled machine tools (hereinafter referred to as NC machine tool) it has been considered advantageous to automatically carry out an intermediate measuring process by interposing a series of measuring programs for a desired measuring process into a part program used for controlling the machining process. However, in practice, this has been impossible to achieve.

When a workpiece has a plurality of bores to be machined, the measuring process for diameters and center coordinate values corresponding to the machined bores on the workpiece are quite complicated, much more so that the process of merely detecting positions of machined surfaces of a workpiece. To include an automatic measuring process it is necessary to provide in addition to machining tools in a tool magazine at least one measuring probe and machining instructions written on an NC tape (sometimes a "tape" is used as the medium for storing a program to read into an NC apparatus) both for machining and measuring. In addition, a program necessary for executing measured data would have to be added in a processing unit of a numerical control device in order to realize a measuring process as well as a machining process on the same NC machine tool arrangement. Further, as the requirement for machining accuracy becomes higher, the following problem presents itself.

Deviation quantities $\Delta x$, $\Delta y$ between a center axis line of a spindle for holding an machining tool and a center axis line of a measuring probe instrument used as a measuring tool, which can be mounted on the spindle, change due to the state with which the measuring tool is mounted on the spindle. For example, there may be an imperfect fit of the measuring probe within the spindle due to the presence of a metal shavings, etc. from previous machining steps. Therefore, if it is desired to determine the coordinate values of the center of a bore in order to machine concentric bores, if the deviation quantities are not predeterminedly measured and compensation is not made, the measured coordinate values of the center of the bore will not be correct due to the center axis line offset.

FIG. 1 illustrates a situation wherein there is an incorrect measurement of coordinates values corresponding to the center of a bore. When a machining process is executed based on such incorrect measurement, a concentric boring process with two steps of machining is unsuccessfully executed. In FIG. 1, a bore 12 with a diameter D1 on a workpiece 11 is machined during a first machining step by using a cutting tool with a diameter D1. Then for getting the bore's center coordinate $(lx_o, ly_o)$, the cutting tool on the spindle is exchanged for a measuring tool mounting a probe 14, and the measuring step is executed.

In case that spindle axis center line L2 is deviated from the true center of bore 12 by $\Delta x$, $\Delta y$ as shown in FIG. 1, the coordinate values corresponding to the center of bore 12 are measured as follows:

$$(lx_o - \Delta x; ly_o - \Delta y)$$

where $lx_o$, $ly_o$ designate the true distances of the bored center from the reference surfaces $Sx_o$, $Sy_o$ of workpiece 11, shown in FIG. 1.

After the measuring step, the spindle axis center line is positioned to L2 by using measured data after the measuring tool on the spindle is exchanged for another cutting tool with a diameter D2, then a second machining step is executed for boring a bore 12A. As shown in FIG. 1, if there are deviation quantities $\Delta x$ and $\Delta y$, and the second machining step is executed without taking account of the quantities $\Delta x$ and $\Delta y$, in other words, without compensating the measured values $lx_o - \Delta x$ and $ly_o - \Delta y$, the result is that bores 12 and 12A are not precisely and concentrically machined.

SUMMARY OF THE INVENTION

The apparatus provided by this invention overcomes this problem of misalignment of center axis lines thereby providing the ability to a numerical control machine tool to include an intermediate measuring process within an overall machining process, the measuring steps being included in the program of the numerical control machining apparatus.

The apparatus of the invention also provides a precise measuring system of a workpiece mounted on a table of a machine tool by compensating for any deviations between the spindle's center axis line and the measuring probe's center axis line.

To accomplish these improved results, the present invention provides a novel, numerical controlled machine tool apparatus which comprises a spindle capable of receiving either a measuring tool or a machining tool responsive to a tool change instruction, driving equipment for relatively moving the spindle to a workpiece being mounted on the table of the NC machine tool, a position detecting device for detecting a relative position of the workpiece to the spindle, and a control device for applying a signal to the driving equipment, which represents instructions commanding relative movements of the workpiece to the spindle responsive to an NC tape carrying a machining program including measuring process steps as well as machining process steps.

The machine tool apparatus also provides a calibration station where at deviation quantities of the measuring tool axis line from the spindle axis line are measured before a measuring process is executed.

The control device is also provided with a memory and a measuring control unit. The memory temporarily stores position data formed from the measured data and calibration data, one of which is the deviation quantities.

The measuring control unit produces the correct position data responsive to a signal representing contact/separation of the measuring tool to/from the workpiece.

BRIEF DESCRIPTION OF THE DRAWINGS

The presently preferred and exemplary embodiment of the present invention will be described in detail with reference to the accompanying drawings, wherein.

DETAILED DESCRIPTION OF THE PREFERRED EMBODIMENT

Figure 1:
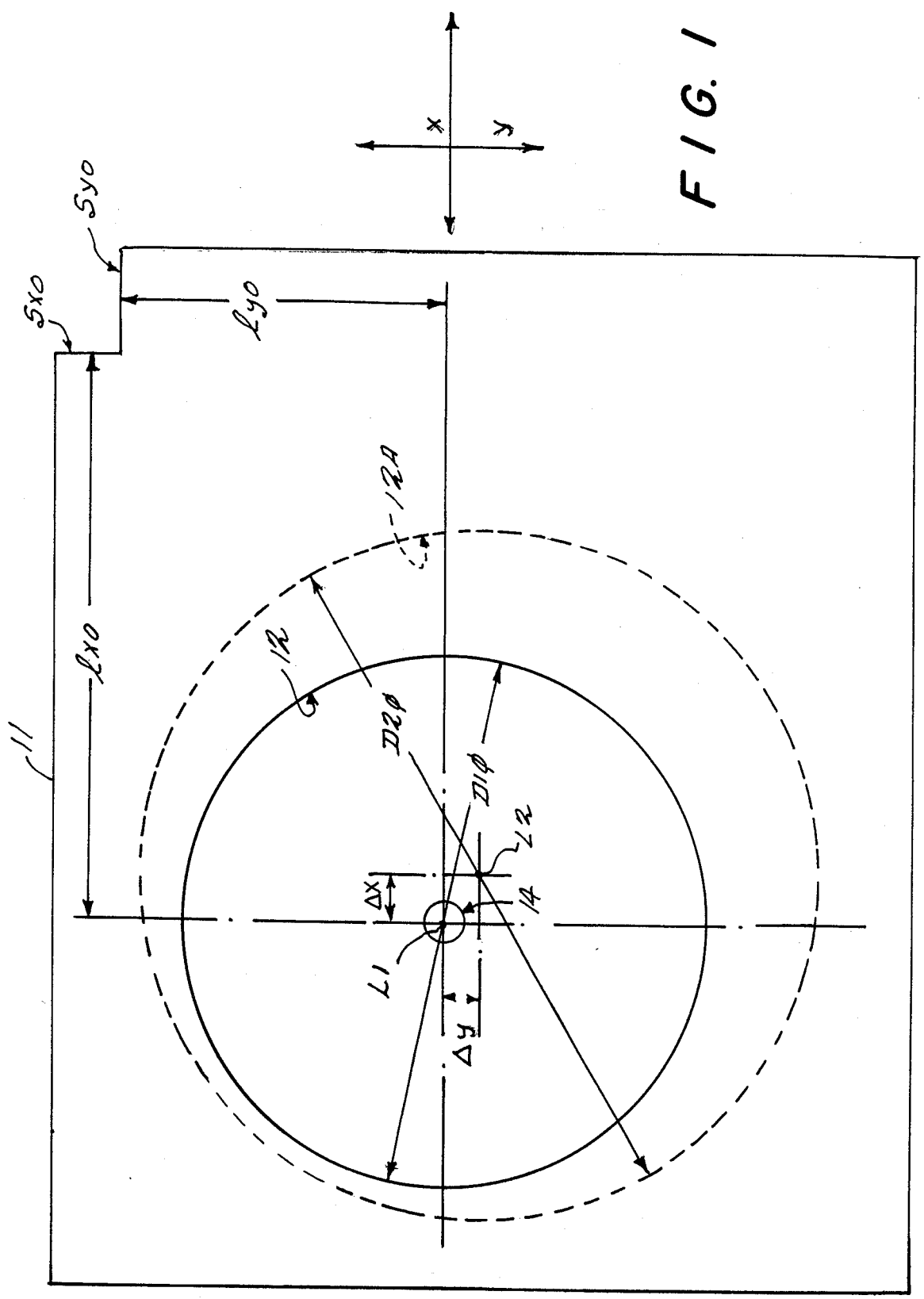
FIG. 1 illustrates a pair of unconcentric bores on a workpiece, which are machined by using measured data without compensations of the deviation of a probe axis line from a spindle axis line.
Figure 2:
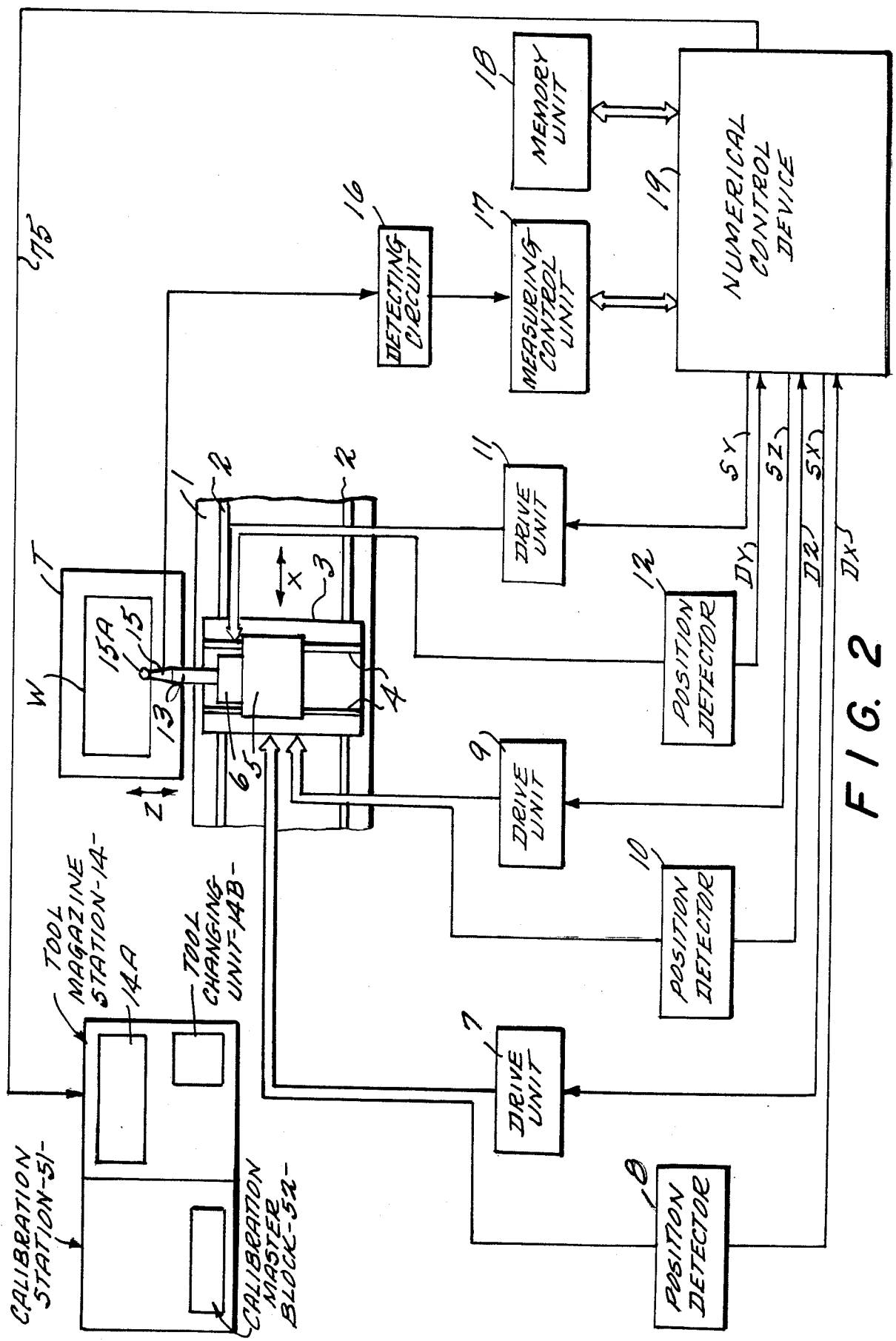
FIG. 2 illustrates a system arrangement showing the preferred embodiment of the present invention.

Referring now to FIG. 2, there is shown the presently preferred embodiment of a numerical controlled machine tool apparatus according to the present invention.

A saddle 3 is slidably mounted on guides 2 formed on upper surfaces of a bed 1 for motion in the direction shown by an arrow x (hereinafter this direction is defined as the x axis direction of a workpiece W on a table T).

A column 5 provided with a head stock 6 is slidably mounted on guides 4 formed on upper surfaces of saddle 3 for motion in the direction shown by an arrow Z (hereinafter this direction is defined as the Z axis direction to the workpiece W).

Head stock 6 slidably mounted on guides (not shown) formed on a side surface of column 5 moves in a direction vertical to a plane of FIG. 2. (Hereinafter this direction is defind as Y axis direction).

A driving unit 7 operates to move saddle 3 responsive to a servo error signal Sx provided by a numerical control device 19 at each sampling time, to the direction of axis X. An X axis position Dx of saddle 3 is detected by a position detector 8.

A driving unit 9 operates to move column 5 responsive to servo error Sz provided by numerical control device 19 at each sampling time, along the direction of axis Z. A Z axis position of saddle 3 is detected by a position detector 10.

A driving unit 11 operates to move head stock 6 rotatably mounting a spindle 13 responsive to a servo error Sy provided by numerical control device 19 at each sampling time, for the direction of axis Y, a Y axis position of saddle 3 is detected by a position detector 12.

Spindle 13 may provide a measuring tool 15 having a probe 15A with a steel ball at a tip portion thereof, or a machining tool for measuring or cutting the workpiece W on table T.

Measuring tool 15 and a plurality of machining tools are stored in a tool magazine station 14 where tool change operations on spindle 13 responsive to a tool change instruction given from a numerical control device 19 through a line 75 are executed.

When measuring tool 15 contacts or separates to/- from the workpiece W under the condition of measuring operation, a signal detecting circuit 16 produces a contact or separation signal which is applied to a measuring control unit 17.

Measuring control unit 17 reads out position data DX, DY and DZ from numerical control device 19 at each time when detecting circuit 16 generates contact or separation signals.

Measuring control unit 17 stores position data DX, DY and DZ temporarily and applies a control signal to numerical control device 19, then determines precise dimensions such as diameter, orthogonal axis coordinate values corresponding to the center of a machined bore on workpiece W by using position data DX, DY, DZ and some compensation data such as radius of the steel ball of probe 15A or deviation quantities between the probe center axis line and spindle center axis line, which are predeterminedly stored in registers of measuring control unit 17.

Measuring control unit 17 supplies the determined dimensions (data) to a memory unit 18.

Memory unit 18 stores the dimensions data provided by measuring control unit 17 to each memory area corresponding to an address designated by numerical control device 19 and supplies the stored data to numerical control device 19 responsive to an address designation provided by numerical control device 19.

Figure 4:
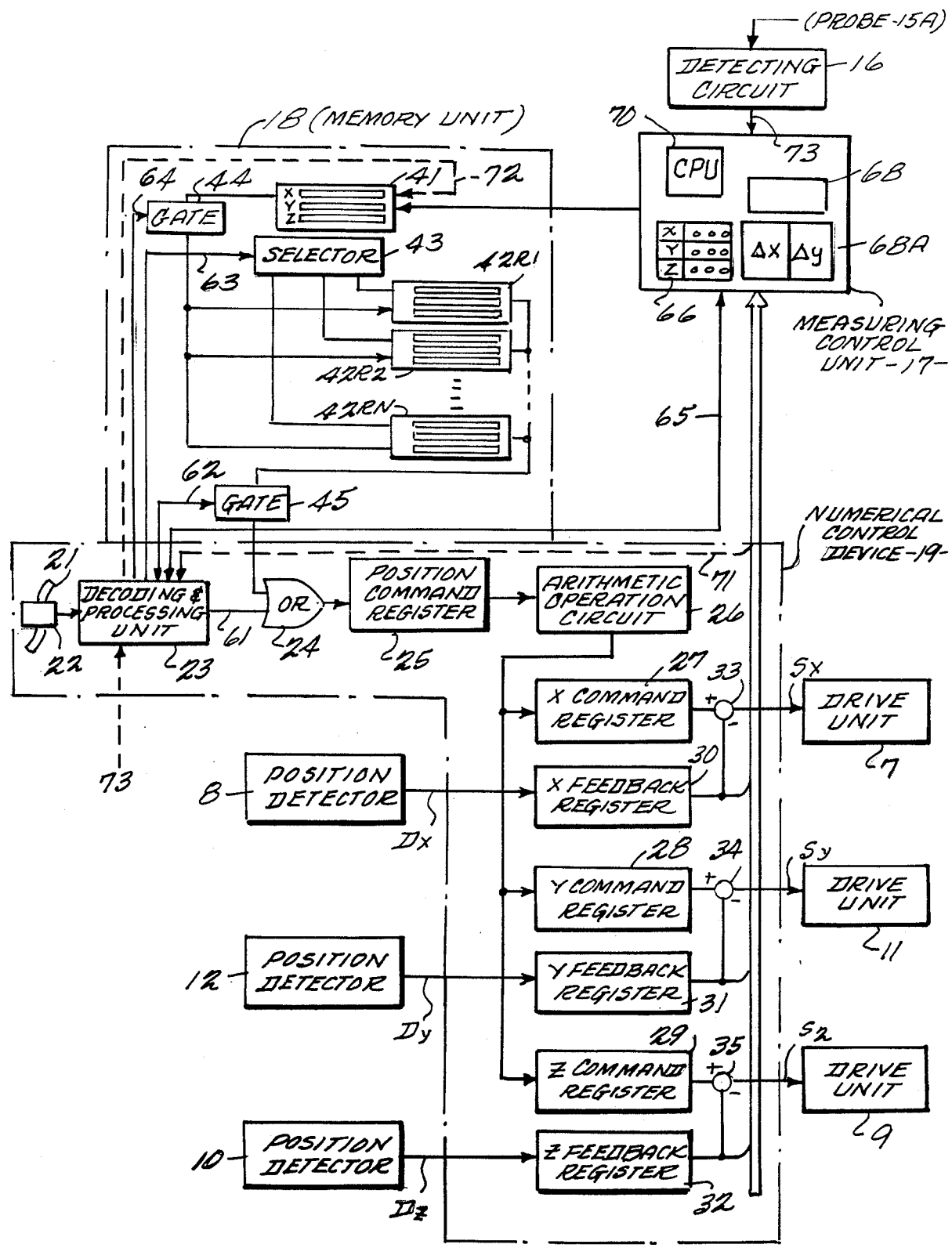
FIG. 4 illustrates a circuit block diagram of a memory section, measuring control section and main section of numerical control.

Numerical control device 19 applies to driving units 7, 11 and 9 servo errors Sx, SY and SZ, respectively, which are defined as the differences between position command values, which are determined from data provided by measuring control unit 17, memory unit 18 or an NC tape reader unit 11 shown in FIG. 4 and position data DX, DY and DZ provided by position detectors 8, 12 and 10, respectively.

Numerical control device 19 also produces signals instructing to the machine tool to carry out a tool change operation, a measuring operation and a machining operation responsive to instructions stored on NC tapes.

A calibration station 51 is located on the left side of a tool magazine station 14, and a calibration master block 52 is mounted on calibration station 51.

Figure 3:
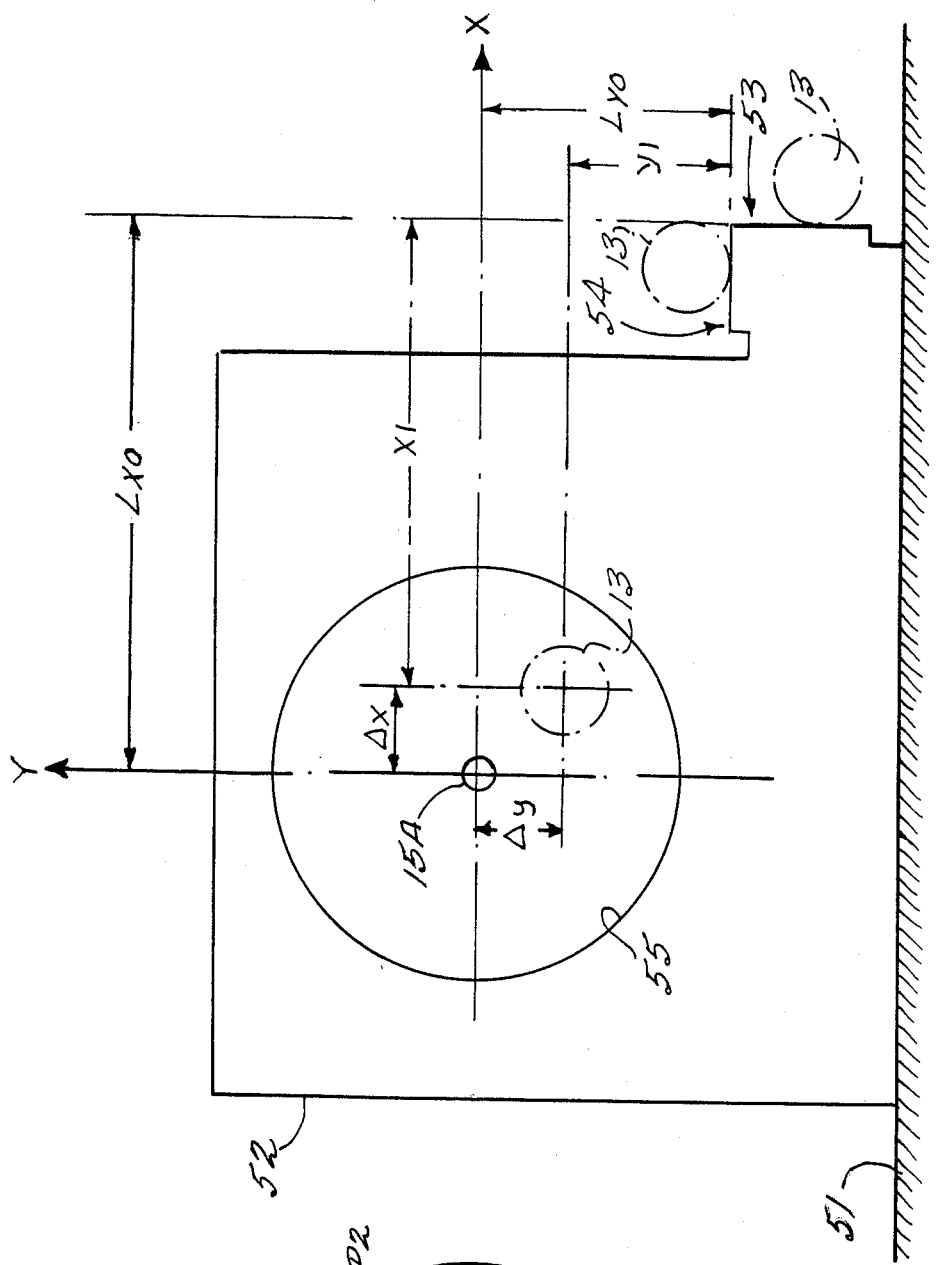
FIG. 3 illustrates calibration station where compensating factors are measured.
Figure 3:
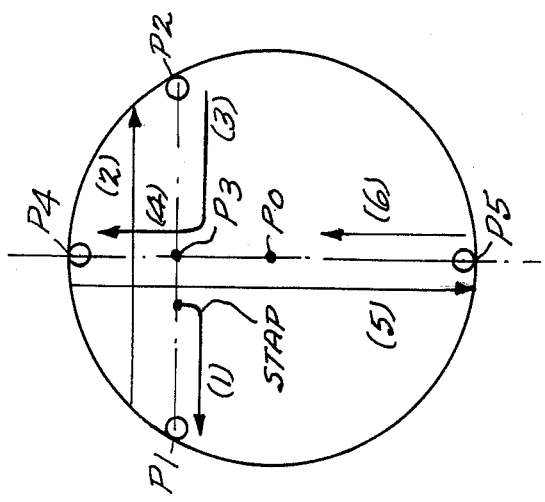

As shown in FIG. 3, master block 52 on calibration station 51 has precisely machined reference surface 53 and 54. Reference surfaces 53 and 54 are used for X and Y axis directions, respectively. Master block 52 has also a precisely machined reference bore 55 which center coordinate values ($Lx_o$, $Ly_o$) from reference surfaces 53, 54 are predeterminedly measured.

Therefore, assuming that the diameter of spindle 13 is d mm, spindle 13 may be precisely positioned to the center of bore 55 by moving spindle 13 by $Lx_o-(d/2)$ in the direction of X and $Ly_o-(d/2)$ in the direction of Y. In order to measure deviation quantities $\Delta x$, $\Delta y$ of the center axis line on probe 15A from the center axis line on spindle 13, the center of probe 15A is positioned so as to coincide with the center of bore 55, and at the state, position data (xl, yl) concerning the center of spindle 13, which are provided by position detectors 8, 12 are read out. Consequently, the required deviation quantities can be calculated by the following equations:

$$\Delta x = Lx_o - xl$$

$$\Delta y = Ly_o - yl$$

Further, in order to position the center of probe 15A to the center of bore 55, numerical control device 19 instructs six steps of bore center detecting process.

At first, the center of probe 15A is located at the point of a starting point STAP as shown in the left side of the FIG. 3.

Responsive to first instruction of the bore center measuring process, the center of probe 15A moves to left direction (step 1). When the steel ball of probe 15A contacts with the inner surface of bore 55 at the point of P1, a contact signal corresponding to the position X1 of spindle 13 is applied from detecting circuit 16 to measuring control unit 17.

Measuring control unit 17 stores in turn the position data X1 in its working memory area.

Then, the center of probe 15A moves to the right direction (step 2). When the steel ball of the probe 15A contacts with the inner surface of bore 55 at the point of P2, a contact signal corresponding to the position X2 of spindle 13 is applied from detecting circuit 16 to measuring unit 17.

Measuring unit 17 stores in turn the position data X2 in its another working memory area. Then, measuring unit 17 figures out a position data Xs of spindle 13 corresponding to the middle point P3 between points P1 and P2 concerning probe 15A.

The position data of X direction is as follows:

$$Xs = (X1 + X2/2)$$

when, the center of probe 15A moves again to the left direction up to the point P3 (step 3). Then, the center of probe 15A moves upwards (step 4).

When the steel ball of probe 15A contacts with the inner surface of bore 55 at the point of P4, a contact signal corresponding to the position Y1 of spindle 13 is applied from detecting circuit 16 to measuring control unit 17. Measuring control unit 17 stores in turn the position data Y1 in its another working memory area. Then the center of probe 15A moves downwards (step 5).

When the steel ball contacts with the inner surface of bore 55 at the point of P4, a contact signal corresponding to the position Y2 of the spindle 13 is applied from detecting circuit 16 to measuring control unit 17.

Measuring control unit 17 stores in turn the position data Y2 in its another working memory area. Then measuring control unit 17 determines a position data Ys of spindle 13 corresponding to the middle point Po between points P4 and P5 concerning probe 15A. Consequently, the position data of Y direction is as follows:

$$Ys = (Y1 + Y2/2)$$

Then, the center of probe 15A moves upwards to the point Po and stops (step 6).

The point Po coincides with the precise center of bore 55.

When probe center stops at the point Po, the corresponding spindle axis coordinate values X1 and Y1 mentioned above are read out.

FIG. 4 is a detailed schematic block diagram of measuring control unit 17, memory unit 18 and numerical control device 19. A decoding and processing unit 23 receives informations previously written on a NC tape 21 through tape reader 22.

The unit 23 decodes the information read from tape reader 22, and classifies the decoded data from causing relative movement between spindle 13 and workpiece W in machining process, in measuring process or in other process, such as tool change operation, and applies the decoded data or signals through signal lines 61, 62, 63, 64 and 65 to each corresponding portion.

When decoded information is data representing relative movement between spindle 13 and workpiece W, the data is supplied through an OR gate 24 to a register 25 for storing position command values for moving spindle 13.

An rithmetic operation circuit 26 determines each of the components corresponding to axis X, Y and Z from the command values stored in register 25 at each sampling time, and supplies them to respective command registers 27, 28 and 29.

An adder 33 produces a servo error signal SX representing the difference between accumulated command values being stored in a X command register 27 and values of an X axis feed back register 30, which are provided from position detector 8. Signal SX is applied to driving equipment 7 as the quantities for spindle 13 to move to the direction of axis X in one sampling time interval.

An adder 34 produces a servo error signal SY representing the difference between accumulated command values stored in a Y command register 28 and values of Y axis feed back register 31, which are provided by position detector 12. Signal SY is applied to driving equipment 11 indicating an amount for spindle 13 to move to the direction of axis Y in one sampling time interval.

An adder 35, further, produces a servo error signal SZ representing the difference between accumulated command values stored in a Z command register 29 and values of Z axis feed back register 32. Signal SZ is applied to driving equipment 9 as an amount for spindle 13 to move to the direction of axis Z in one sampling time interval.

Measuring control unit 17 receives responsive to a signal given from detecting circuit 16 the values of registers 30, 31 and 32 and stores them in a data memory 66 under the condition that decoding and processing unit 23 instructs so as to execute a measuring process through a signal line 65.

Measuring control unit 17 is also provided with a parameter memory 68 for storing parameters such as deviation quantities Δx, Δy shown in FIG. 3 and diameters of the steel ball mounted on probe 15A's top, and a processor unit 70.

Processor unit 70 operates to produce correct position data used for positioning or moving spindle 13 after the measuring process by compensating position data being stored in data memory 66.

Memory unit 18 is provided with a register 41 which receives the correct position data supplied from measuring control unit 17, a plurality of registers 42R1, 42R2–42RN which store the correct position data transferred through a gate 44 from register 41, a selector 43 which selects one of registers 42R1–42RN in accordance with an address code signal on signal line 63, which is decoded by decoding and processing unit 23, and a gate 45 which allows to pass the correct position data stored in one of registers 42R1–42RN, which is designated by selector 43 when machining process starts again after measuring process terminates. Gate 44 opens or closes in accordance with a signal on signal line 64. Gate 44 opens during measuring process and it closes during machining process.

Although measuring control unit 17 is shown in the Figure as being separated from numerical control device 19, it may be included in decoding and processing unit 23. The contents of each feed back register 30, 31 and 32, and contact or separation signal 73 are applied to decoding and processing unit 23.

Further, correct position data is also supplied to register 41 through signal line 72 as shown with broken lines.

There are a plurality of function words to be written on NC tape 21. A first type of function words, called tool function words, designate tools for machining after measuring process. A second type of function words, called measuring function words, for designating measuring operation; and address code for designating an address corresponding to one of registers 42R1- and 42R2.

A third type of function words, called moving and orientating function words, are for designating positioning of spindle 13 to tool magazine station 14 and orientating the spindle to a specific angle position. A fourth type of function words, called miscellaneous function words are for designating tool changing operation. A fifth type of function words, called preparing function words, are for designating positioning of spindle 13 to a position in accordance with correct position data being stored in each registers 42R1, 42R2 . . . and 42RN.

According to these instructions for function words given from NC tape 21, after a machining process, it is assumed that measuring tool 15 is mounted on spindle 13, and when tool function words are applied to decoding and processing unit 23, numerical control device 19 supplies a signal representing selecting of a machining tool (T1) designated by the tool function words through signal line 75 (FIG. 2) to tool magazine station 14 where the designated tool T1 is located to the tool changing position of a tool magazine 14A of tool magazine station 14.

Then, when measuring function words and address codes for designating measuring operation are applied to unit 23, driving equipment 7, 9 and 11 operate due to measuring operation modes designated by the measuring function words, thereby the measuring process is executed. While the measuring process is executed, measuring control unit 17 executes arithmetic operations based on position data given from feedback registers 30, 31 and 32, and applies the correct position data of the operations to register 41. Correct position data being stored in register 41 as the result of the operations is stored in one of registers 42R1, 42R2, . . . and 42RN, one of which selector 43 selects in accordance with designated address code.

The stored correct position data in held in the selected register.

Then, when moving and orientating function words are applied to unit 23, spindle 13 is moved to the tool changing position. When a miscellaneous function words (M06) for designating a tool changing operation is applied to unit 23, measuring tool 15 on spindle is exchanged for a machining tool (T1) located at the tool changing position on tool magazine 14A.

When preparing function words and address codes for designating moving and positioning of spindle 13 mounting machining tool (T1) are applied to unit 23, gate 45 opens and correct position data previously stored in registers 42R1, . . . 42RN are transferred through gate 45 and OR gate 24 to position command register 25.

Accordingly, spindle 13 is moved to a position corresponding to data being stored in position command register 25, and is positioned there.

Thus, even if spindle 13 moves to the tool changing position for changing measuring tool 15 to another machining tool (T1) for next machining process after measuring process, since spindle 13 is moved due to the correct position data measured and compensated in advance in the measuring process, new machining tool (T1) on spindle 13 also is precisely positioned at those positions while the next machining process is executed.

The following shows main portions of part program written on NC tape 21, including a measuring process and a machining process of concentric bores.

| Program Step No. | | Function Words | | |
| --- | --- | --- | --- | --- |
| (1) | N100 | T1 | | |
| (2) | N200 | G204 | Q01 | |
| (3) | N300 | G00 | X630000 | Y500000 | Z500000 |
| (4) | N400 | M06 | | |
| (5) | N500 | G00 | Q01 | |

In this case, let us assume that spindle 13 mounts measuring tool 15, and measuring deviation quantities ($\Delta x, \Delta Y$) of a center axis line of measuring tool 15 being mounted on spindle 13 from a center axis line of spindle 13 has been already executed and measured data which is stored in measuring control unit 17.

First step (1) shows part program number 100 (N100) designating tool function words for selecting a machining tool which code is T1.

Numerical control device 19 applies a signal for selecting the tool T1 on tool magazine 14A to tool magazine station 14 and locates it to the tool changing position on tool magazine 14A.

Then, second step (2) shows part program number 200 designating a measuring and address code function words (G204 Q01).

Decoding and processing unit 23 instructs responsive to the code G204 a series of moving steps of spindle 13, which are similar to the six steps shown in FIG. 3, for measuring the coordinate values ($X_o, Y_o$) corresponding to the center of a bore on workpiece W, which is already machined before the first step (1).

The measured coordinate values ($X_o, Y_o$), which are correct position data, are supplied from measuring control unit 17 to register 41 of memory unit 18.

Decoding and processing unit 23 produces responsive to address code Q01 a gate signal on signal line 64 for opening gate 44 and also produces a selecting signal on signal line 63 for selecting one of registers 42R1, 42R2 . . . and 42RN, for instance register 42R1, thereby correct position data ($X_o, Y_o$) being stored in register 41 are transferred to register 42R1.

Third step (3) shows part program number 300 designating moving and orientating function words G00 and position data to be positioned in the directions of axes X, Y and Z.

Decoding and processing unit 23 instructs responsive to codes G00 and X630000, Y500000 and Z500000 to move spindle 13 mounting measuring tool 15 to the tool changing position, thereby spindle 13 moves and positions there.

Fourth step (4) shows part program number 400 designating miscellaneous function words M06 representing a tool changing operation.

Tool changing unit 14B operates to remove measuring tool 15 from spindle 13 and to mount machining tool T1 on spindle 13. Fifth step (5) shows part program number 500 designating moving and positioning function words G00 and Q01.

Decoding and processing unit 23 produces, responsive to the code Q01, a gate signal on signal line 61 to open gate 45 and a selecting signal on signal line 63 to select register 42R1, thereby the correct position data, previously stored in register 42R1, are transferred through gate 45 and OR gate 24 to position command register 25. As the result, spindle 13, now mounting machining tool T1 for next machining process, moves and the center axis line of spindle 13 is located so as to coincide with the center of the bore for which coordinate values (X1, Y1) were measured at the step (1) mentioned above. Consequently, the next program step (6) (not shown) for example, a bore, which diameter is larger than before, is concentrically machined.

Figure 5:
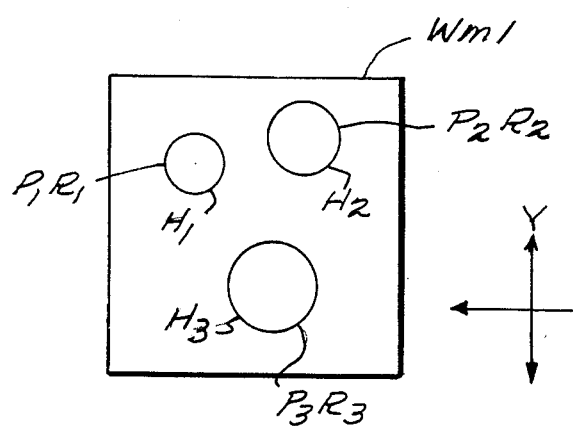
FIGS. 5 and 6 illustrate model workpieces $\overline{W}m1$, $\overline{W}m2$ for measuring.

FIG. 5 illustrates a model workpiece $W_{ml}$ having three bores H1, H2 and H3.

The model workpiece $W_{ml}$ is mounted on the table T of the machine tool shown in FIG. 2.

In the case of a measuring processes for measuring coordinate, values P1, P2 and P3 corresponding to each center of bores H1, H2 and H3 and radius values R1, R2 and R3 of the bores are written on NC tape 21, decoding and processing unit 23 produces, responsive to measuring function words on NC tape 21, signals necessary for executing the measuring process.

While the measuring process is executed, correct center coordinate values and the radius values (P1, R1), (P2, R2) and (P3, R3) of bores H1, H2 and H3 are stored in registers 42R1, 42R2 and 42R3, respectively.

Then, after the model workpiece $W_{ml}$ is removed from table T of the machine tool, another workpiece $W_{ml'}$ for machining is mounted on the table T so as to be machined as the same of the model workpiece $W_{ml}$. For machining of the workpiece $W'_{ml'}$ the correct position data being stored in registers 42R1, 42R2 and 42R3 are used.

In this case, the machining process for workpiece $W'_{ml}$ has two steps. At first step, a drill, which diameters are smaller than those of bores H1, H2 and H3, is mounted on spindle 13, then decoding and processing unit 23 reads out sequentially correct position data P1, P2 and P3 being stored in registers 42R1, 42R2 and 42R3 responsive to machine sequence instructions provided by NC tape 21, so that spindle 13 moves and positions to each centers of bores H1, H2 and H3, and prepared bores, which diameters are smaller than those of finished bores H1, H2 and H3, are machined by the drill mounted on spindle 13.

At a second machining step, decoding and processing unit 23 reads out correct position data P1 and measured radius R1 responsive to boring machine sequence instructions given from NC tape 21, so that spindle 13 moves to the tool changing position, and tool changing operation for exchanging the drill for a machining tool which radius equals to R1 is executed there.

Further, spindle 13 mounting the machining tool is positioned at the position of P1 and finishing boring is executed there for machining a bore H1. Other bores H2 and H3 on workpiece $W'_{ml}$ are machined by the same process with the case of the bore H1 mentioned above.

Consequently, a plurality of workpieces $W'_{ml}$ can be machined like the model workpiece $W_{ml}$.

Figure 6:
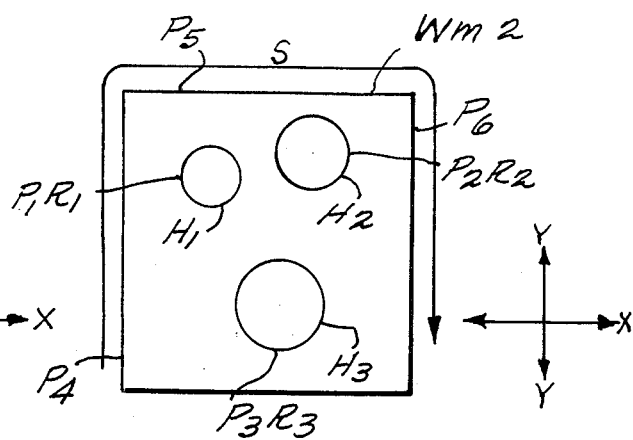

FIG. 6 illustrates still another model workpiece Wm2 which outer surface points are designated as points P4, P5 and P6.

In the case, measuring process is executed not only for making bores H1, H2 and H3 but also at surface points P4, P5 and P6 which coordinate values are measured and stored in registers 42R4, 42R5 and 42R6, respectively. Consequently, after mounting a milling cutter, spindle 13 may be moved along the pass measured on model workpiece $W_{m2}$ shown by an arrow "S" besides bores H1, H2 and H3 for machining a workpiece $W'_{m2}$ like model workpiece $W_{m2}$.

Figure 7:
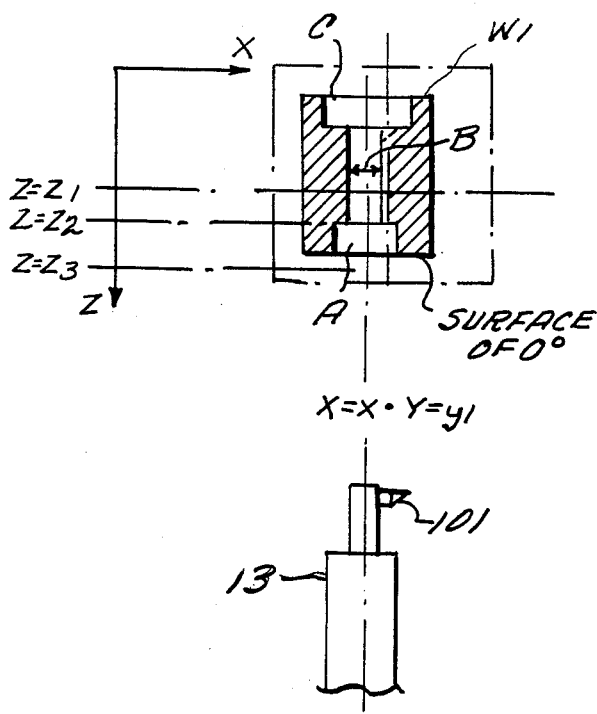
FIGS. 7 and 8 illustrates a workpiece machined concentrically in accordance with the present invention.

FIG. 7 illustrates a workpiece W1 on the table T having a prepared bore B, on which concentric bores A and C concerning bore B are machined later.

Figure 8:
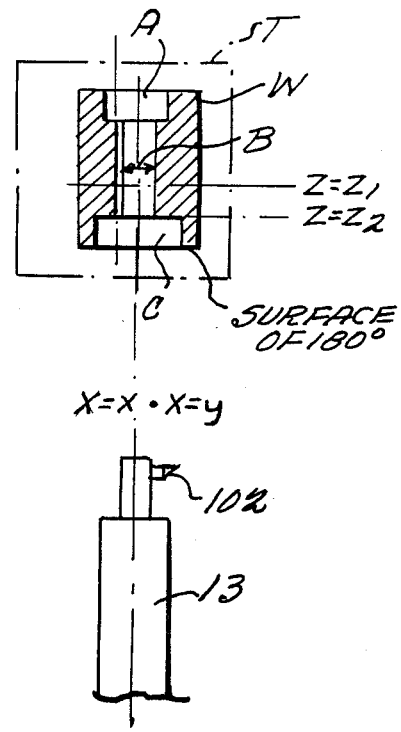

FIG. 8 illustrates the workpiece W1 on the table T which is rotated by 180° from the position shown in FIG. 7.

Reference numerals 101, 102 designate a bore tool on spindle 13 for machining a bore A and C, respectively. The following table (1) shows as an example of this invention listing of parts program for executing a machining and measuring processes to machine workpiece W1 having the prepared bore B.

At the right side portion of the table, for each program step of the list, there is provided a description explaining about the instruction being executed at each step.

TABLE(1)

| | Instruction | Explanation |
|---|---|---|
| (1) | N010T01 | selecting a probe (T01) as a measuring tool: |
| (2) | N020M06 | mounting the probe T01 on the spindle: |
| (3) | N030T02 | selecting a machining tool for bore "A:: |
| (4) | N040G43H00 | compensating the length of probe T01: |
| (5) | N050G00 $X_{xl} Y_{yl}$ | positioning the probe T01 at a position of coordinate values |
| (6) | N060 $Z_{zl}$ | (X1, yl, zl) near to the center of bore "B": |
| (7) | N070 G202 | positioning temporarily the probe at coordinate values of the center for the bore B: |
| (8) | N080 G202 Ql | measuring a correct position data corresponding to the precise center of the bore "B" and storing the measured and corrected position data to a register Ql: |
| (9) | N090 G44 | cancelling compensation instruction for the length of the probe T01; |
| (10) | N100 G73 $Z_{za}$ | moving the spindle to the tool changing position (xa, ya, za); |
| (11) | N110 G73 $X_{xa} Y_{ya}$: | changing the probe T01 on spindle to the machining tool T02 selected at step (3); |
| (12) | N120 M06 | |
| (13) | N121 T01 | selecting the probe T01 again so as to locate at the tool changing |

TABLE(1)-continued

| Instruction | Explanation |
|---|---|
| (14) N130G43H01 | position on the tool magazine; compensating tool length of the machining tool T02 for the bore "A"; |
| (15) N140 $S_{s1}$ M03 | starting to rotate the spindle at a rotation speeds S1; |
| (16) N150G205 $X_{xl} Y_{yl}$ Q1 | positioning the spindle to the center position of bore "B"; |
| (17) N160 $Z_{z3}$ | |
| (18) N170G01$z_{z2}F_{f1}$ | machining the bore "A" concentrically at a speed f1; |
| (19) N180G00G44 | cancelling compensation instruction for length of the tool T02; |
| (20) N190G73$2_{za}$ | moving the spindle to the tool |
| (21) N200G73$\overline{X_{xa}}\,Y_{ya}$ | changing position (xa, ya, za); |
| (22) N210M06 | mounting the probe T01 on the spindle again; |
| (23) N220T03 | selecting a machining tool T03 for machining the bore "C"; |
| (24) N230G43H00 | compensating the length of probe T01; |
| (25) N230B180 | rotating the table by 180°; |
| (26) N250$X_{xl'}Y_{yl'}$ | positioning the spindle to a position (xl', yl', zl') near the |
| (27) N250 $Z_{zl'}$ | center position of the bore "B"; |
| (28) N260G2O2 | positioning temporarily the probe at coordinate values of the center for the bore "B"; |
| (29) N270G202 Q1 | measuring a correct position data (x2, y2) corresponding to the precise center of the bore "B", and storing the measured and corrected position data to the register Q1; |
| (30) N280G44 | cancelling compensation instruction for the length of the probe T01; |
| (31) N290G73 $Z_{za}$ | moving the spindle to the tool |
| (32) N300G73 $\overline{X_{xa}}\,Y_{ya}$ | changing position (xa, ya, za); |
| (33) N310M06 | mounting the machining tool T03 selected at step (23) on the spindle (tool changing operation); |
| (34) N320T04 | selecting a next machining tool 104; |
| (35) N330G43H02 | compensating the length of the machining tool T03; |
| (36) N340$S_{s1}$ | starting to rotate the spindle; |
| (37) N350G205 $X_{xl} Y_{yl}$ Q1 | positioning the spindle to the correct center position of the |
| (38) N360 $Z_{z3}$ | bore "B"; |
| (39) N370G01$Z_{z2} F_{f1}$ | machining the bore "C" concentrically; |
| (40) N380G00G44 | cancelling compensation instruction for the length of the machining tool T03; |
| (41) N390G73$2_{za}$ N400G73$\overline{X_{xa}}\,Y_{ya}$ | moving the spindle to the tool changing position (xa, ya, za); |
| (42) N410M06 | mounting the next machining tool T04 selected at step (34) on the spindle (tool changing operation). |

In the above mentioned table list, the words at program step (4) G43H00 designate function words indicating a compensation function words (G43) for compensating the length of a tool being mounted on spindle 13. The compensation data is read out from a memory area which address code is H00.

At steps (7) and (8), G202 designates a kind of measuring function words.

At step (9), G44 designates a cancellation function words.

At step (10) and (11), G73 designates moving and orienting function words for moving spindle to tool changing position.

At step (15), M03 designates miscellaneous function words for rotating spindle 13.

At step (16), G205 Q1 designates the measuring and address code function words for designating a measurement of the center of the bore B and storing it to a memory area of address code Q1.

At step (25), B designates rotation function words for table rotation.

According to the present invention, since the measured position data on a machined workpiece, given from the position detector corrected on the measuring control unit by using predeterminedly stored compensation data concerning the measuring tool itself, for instance a radius of steel ball mounted on the top of a probe, or concerning the measuring tool and the spindle under a measuring process, and the corrected position data is stored in the memory, the spindle is capable of being precisely positioned to the same position or surface at which machining has been made by reading out the contents of the memory storing the corrected position data under a machining process after the measuring process. As a result, machining accuracy can be reached much higher and faster than in conventional machining process, particularly in a concentric bore machining process.

Further, since the measuring process produces precise and correct position data which are stored in the memory and the stored data are read out and made use for a machining process later, the programming operation of instructions of each position data for the later machining process becomes very simple.

Also an operator for the programming does not have to know the precise and correct position data for the later machining process.

Further, since the memory comprises a plurality of registers corresponding to address codes decoded in the numerical control device and the address codes are designated again for the later machining process, a plurality of machining processes are continuously executed by sequentially reading out the position data stored in the plurality of registers due to the corresponding address codes given in the later machining process.

Consequently, the present invention is also applicable to machine a workpiece so as to form the same profile with a model workpiece to which a measuring process is applied.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed:

1. A numerical controlled machine tool apparatus comprising:
    a table for holding a workpiece to be machine;
    a spindle capable of selectively mounting either a measuring tool or a machining tool responsive to a tool change instruction;
    a driving means for moving the spindle relative to said workpiece;
    a position detecting means for detecting a relative position of the spindle and the workpiece;

control means for applying a signal to the driving means, the signal representing an instruction commanding a relative movement of the spindle to the workpiece responsive to an input data given thereto, said control means comprising:

a measuring control means for producing correct position data responsive to a signal representing contact or separation of said measuring tool on the spindle to or from the workpiece and in accordance with compensation values, and a memory means for storing said correct position data provided by said measuring control means; and a calibration station having a master block with reference surfaces for each of the X and Y axis directions and a reference bore wherein deviation quantities of a center axis line of said measuring tool from a center axis line of said spindle are measured each time the measuring tool is mounted on said spindle, the deviation quantities being stored as said compensation values in said measuring control means.

2. A numerical controlled machine tool apparatus as in claim 1, wherein said control means comprises a numerical control device providing its signal applying function, said numerical control device comprising:

input means having data for controlling said machine tool operation;

decoding and processing means for decoding said data from said input means, and processing it for producing position data;

a command register for storing said position data provided by said decoding and processing means; and command-signal producing means for producing said signal to be applied to said driving means.

3. A numerical controlled machine tool apparatus as in claim 2, wherein said memory means comprises:

a buffer register for temporarily storing said correct position data;

a plurality of registers each for storing the correct position data transferred from said buffer register;

a selector for selecting one of said plurality of registers responsive to a signal provided by said numerical control device, gate means for allowing said correct position data stored in said buffer register to be transferred to said plurality of registers and for allowing said correct position data stored in said plurality of registers to be transferred to said numerical control device responsive to a gate signal provided by said numerical control device.

4. A numerical controlled machine tool apparatus as in claim 2 wherein said memory means is provided in said decoding and processing means.

5. A numerical controlled machine tool apparatus as in claim 2, wherein said decoding and processing means comprises a program for executing a measurement of coordinate values corresponding to a center of a bore on said workpiece.

6. A numerical controlled apparatus as in claim 2 wherein said measuring control means is constituted physically by a separate structure from the structure of said numerical control device.

7. A numerical controlled apparatus as in claim 2, wherein said measuring control means is provided as part of the physical structure of said decoding and processing means.

8. An apparatus as in claim 2, wherein said decoding and processing means produces a selecting signal corresponding to an address decoded from said data provided by said input means, a register of said memory means having the corresponding address being designated thereby for storing therein or reading out therefrom said correct position data.

9. An apparatus as in claim 2, wherein said input means provides data for controlling a machining process and for controlling a measuring process carried out by said numerical controlled machine tool apparatus.

10. A numerical controlled machine tool apparatus as in claim 1, wherein said measuring control means comprises:

a first memory area for storing a compensation values for said machining tool; and a second memory area for storing compensation values for said measuring tool, each of said compensation values being predeterminedly stored in said memory areas, respectively.

11. An apparatus as in claim 1, further including a tool magazine for storing said measuring tool and said machining tool.

* * * * *